(12) United States Patent
Van Dijk

(10) Patent No.: US 7,445,830 B2
(45) Date of Patent: Nov. 4, 2008

(54) REINFORCED PROFILE CONTAINING ELEMENTS TO LIMIT EXPANSION

(75) Inventor: Dirk Van Dijk, Beneden (GB)

(73) Assignee: Tech-Wood International Ltd., Guernsey (GB)

( * ) Notice: Subject to any disclaimer, the term of this patent is extended or adjusted under 35 U.S.C. 154(b) by 0 days.

(21) Appl. No.: 11/841,295

(22) Filed: Aug. 20, 2007

(65) Prior Publication Data

US 2008/0003427 A1 Jan. 3, 2008

Related U.S. Application Data

(63) Continuation-in-part of application No. 11/758,484, filed on Jun. 5, 2007, which is a continuation of application No. 10/801,989, filed on Mar. 16, 2004, now Pat. No. 7,241,484.

(60) Provisional application No. 60/459,167, filed on Mar. 31, 2003.

(30) Foreign Application Priority Data

Mar. 17, 2003 (NL) .................................... 1022946

(51) Int. Cl.
*B32B 9/00* (2006.01)
(52) U.S. Cl. ..................... 428/114; 52/729.1; 52/729.4; 52/731.2; 428/105
(58) Field of Classification Search ................. 428/105, 428/114; 52/729.1, 731.2, 309.7, 309.16, 52/729.4
See application file for complete search history.

(56) References Cited

U.S. PATENT DOCUMENTS

| 5,885,685 | A   | * | 3/1999  | Tingley ....................... 428/105 |
| 5,974,760 | A   | * | 11/1999 | Tingley ....................... 52/837  |
| 6,082,073 | A   | * | 7/2000  | Silvanus et al. .............. 52/842   |
| 6,173,550 | B1  | * | 1/2001  | Tingley ....................... 52/837  |
| 6,370,833 | B1  | * | 4/2002  | Rastegar ...................... 52/837  |
| 6,684,596 | B2  | * | 2/2004  | Rastegar ...................... 52/837  |
| 6,895,723 | B2  | * | 5/2005  | Knokey et al. ................ 52/841   |

* cited by examiner

*Primary Examiner*—N Edwards
(74) *Attorney, Agent, or Firm*—Robert G. Weilacher; Smith, Gambrell & Russell

(57) ABSTRACT

A compound construction element formed of a composite material which composite material includes a matrix of thermoplastic synthetic material including wood particles or other cellulose-containing particles in a content on the order of 50% by weight or more, wherein also one or more continuous additional reinforcement elements are attached to the exterior or incorporated in the interior of the elements, that result in the reduction of length expansion due to moisture uptake.

11 Claims, 3 Drawing Sheets

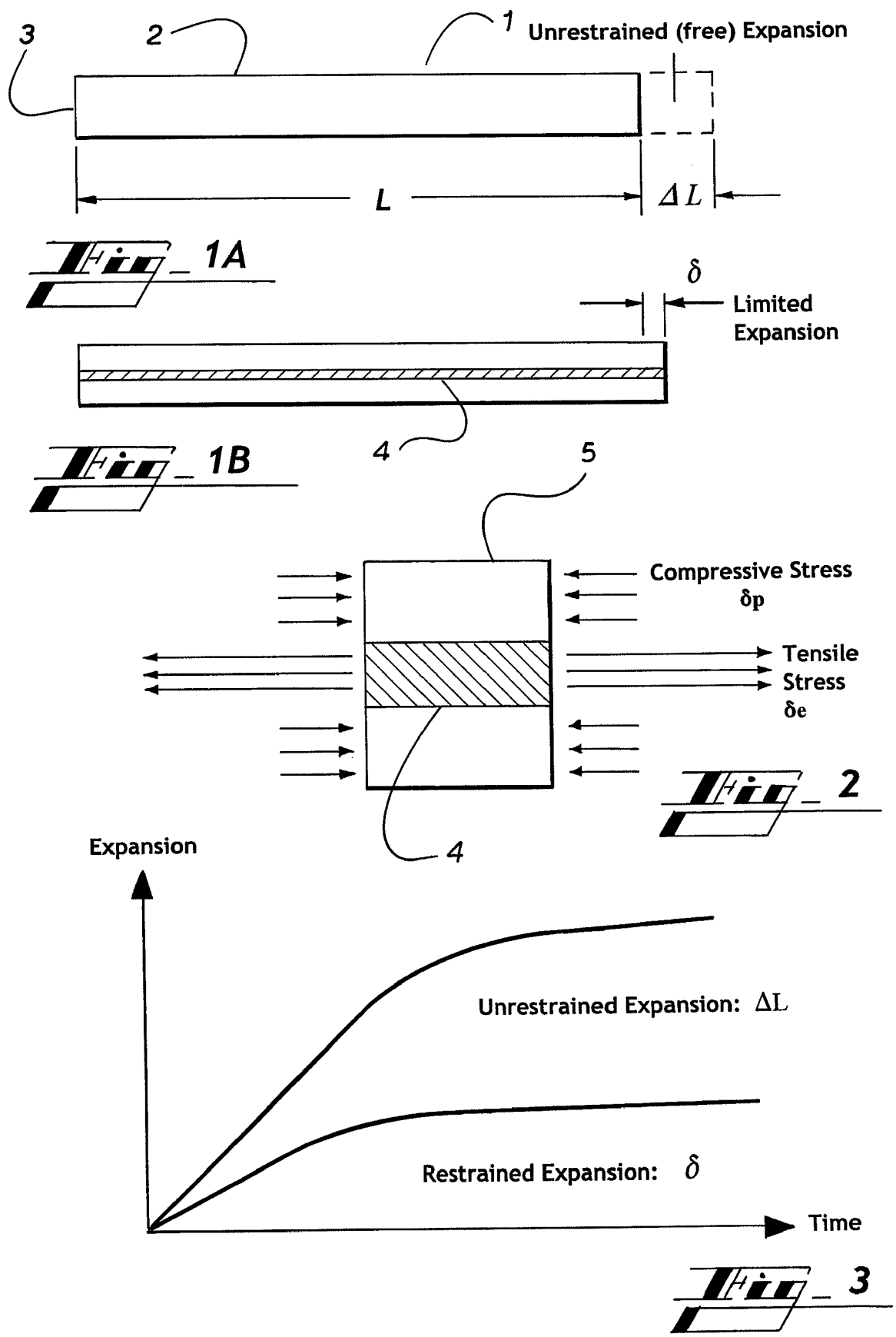

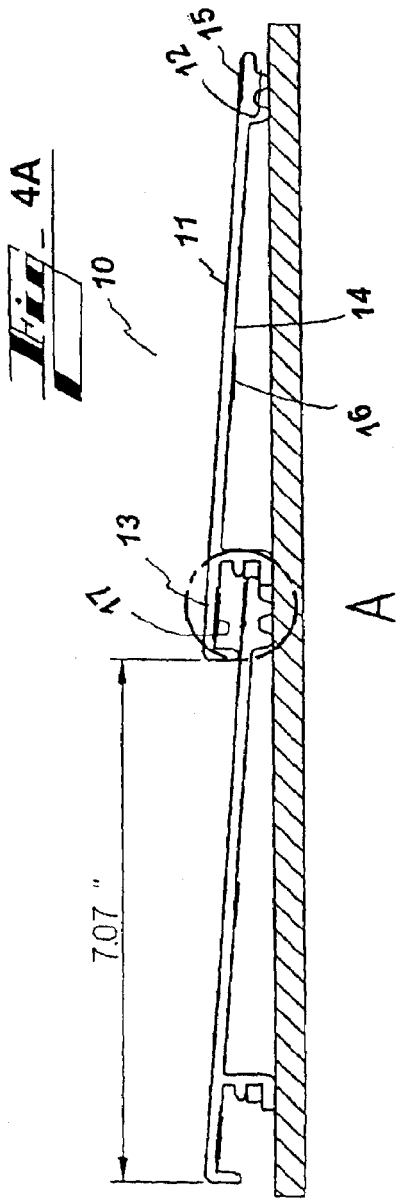
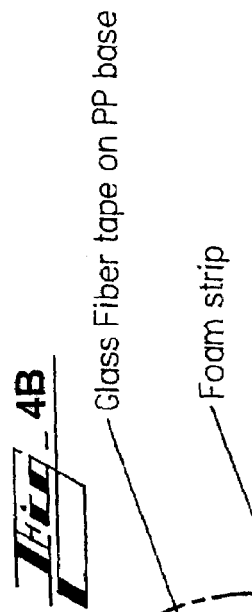
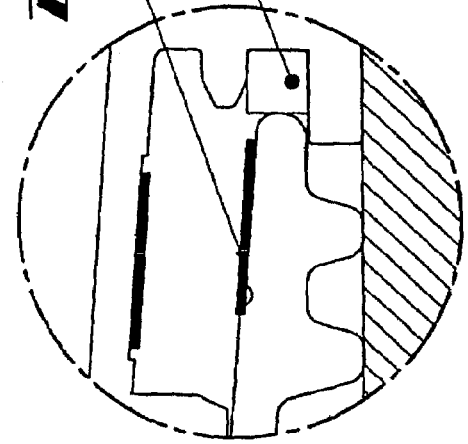

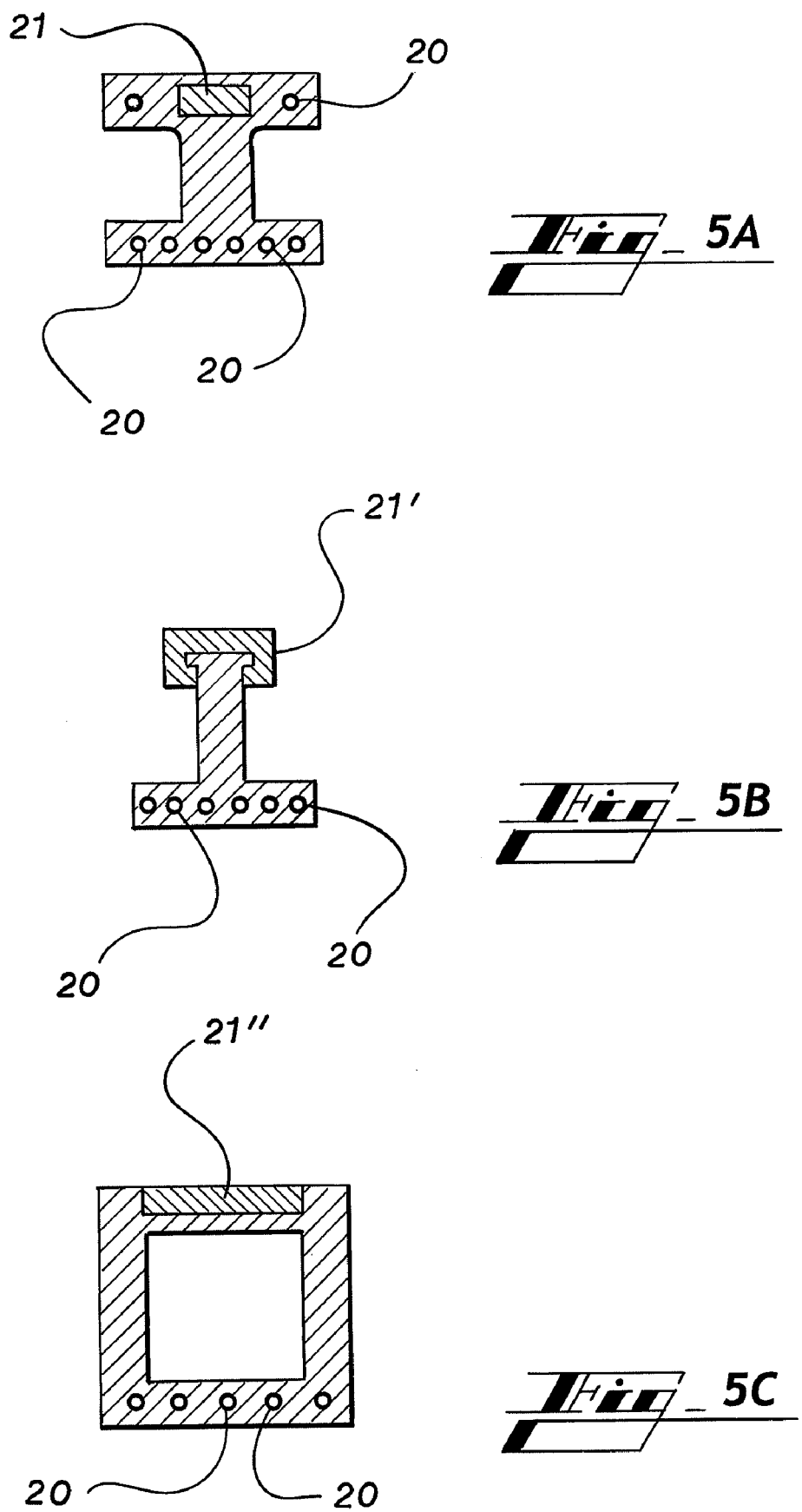

REINFORCED PROFILE CONTAINING ELEMENTS TO LIMIT EXPANSION

CROSS-REFERENCE TO RELATED APPLICATION

This application is a continuation-in-part of application Ser. No. 11/758,484 filed Jun. 5, 2007 which in turn is a continuation of application Ser. No. 10/801,989, filed Mar. 16, 2004, now U.S. Pat. No. 7,241,484 and which claims the benefit of U.S. Provisional Application No. 60/459,167, filed Mar. 31, 2003, and the benefit of priority application in the Netherlands NL 1022946 filed Mar. 17, 2003, which are relied on and incorporated herein by reference.

INTRODUCTION AND BACKGROUND

The present patent application describes a new way to reduce the expansion of wood-plastic composites or more generally reduce the expansion of plastic composites containing cellulose particles. This unwanted expansion is caused by inevitable moisture absorption after production of these specific composite products. Wood plastic composites or more generally plastic composites containing cellulose particles normally are manufactured in a relatively dry state. This is necessary for obtaining a good product quality. After the manufacturing process these composite products will absorb moisture until an equilibrium state is reached. The uptake of moisture by the composite is accompanied by a dimensional expansion. This expansion can cause serious problems when it is restrained, or, alternatively may require unattractive large expansion gaps (dilatation gaps). Specially for applications of these composites in long profiles, e.g. for siding, decking, roof cladding or retaining walls the large expansion gaps (dilatations) that are necessary for allowing expansion create problems in the use of these materials. Sometimes expansion gaps are aesthetically unacceptable but also the necessity of expansion gaps may cause an unacceptable risk of forgetting them during installation. On the other hand, there is a need to make long profiles of these composites because these materials offer an optimum combination in terms of freedom in profile design, mechanical properties, durability, machineability, ease of installation and cost.
1. There is a need for profiles made of wood plastic composites or in general plastic composites containing cellulose particles.
2. There is a need for products as described in 1 that can be installed without expansion gaps.
3. There is a need for products as described in 2 without having future problems due to the expansion behavior of these products.
4. There is a need for products as described in 3 that can be machined with wood-working tools.

SUMMARY OF THE INVENTION

It is an object of the invention to provide improved reinforced profiles and a method of making same.

It is a further object of the invention to provide a profile and a method of manufacture thereof that results in profiles that resist changes in dimension or appearance due to uptake of moisture.

The principle of the reduction of the expansion of the present composites is to provide the composite profile with relatively stiff, continuous, non-elastic elements that partly restrain the free expansion. This stiff element that is incorporated as a part of the wood plastic composite will be referred to herein as a 'restraining element'. The resulting internal stresses are compression stresses in the plastic-based composite product and tensile stresses in the restraining element. Thus, no stresses are occurring on the surroundings although the product is suppressed in its expansion. Moreover, the internal stresses will partly diminish because of creep effects in the plastic component of the plastic-based composite.

Profiles according to the present invention can be produced by a method for manufacture of a compound construction element by an extrusion process, wherein a composite material is pressed through an extrusion die, which composite material comprises a matrix of thermoplastic synthetic polymer material including wood particles or other cellulose-containing particles in a content on the order of 50% by weight or more, preferably 50-80% by weight, more preferably approximately 70-80% by weight. One or more elongated additional reinforced elements are then attached to the exterior of such profiles and are brought into tight engagement with the composite material. The profiles of the present invention can also have embedded therein reinforcement elements as described in copending application Ser. No. 10/801,989.

In the process of this invention, a profile is obtained that has a wood-like appearance, and thus is suitable for placing in locations where it would be visible and wherein the elongated, additional elements can provide an extra reinforcement function to the profile. This for instance particularly, but not exclusively, regards reinforcement elements. Moreover the profile of this invention, despite its hardness, can be nailable and/or screwable, as a result of which many structural or construction possibilities become feasible, which would not have been possible in the case of conventional concrete or steel elements. An example of the utility of reinforced profiles according to the invention is in providing a supporting framework on which a floor or terrace can be mounted by means of nails or screws.

The basic profile described in this application can be made by an extrusion process with subsequent cooling in a die attached to an extruder. Such process is also known as a pushtrusion process. Preferably, a further cooling takes place in a cooling tank, placed at a distance downstream of said shaping die. A calibration die may be placed immersed in the coolant in the cooling tank. The basic method is shown in copending application Ser. No. 10/801,989.

The additional continuous reinforcement elements are added externally to the profile after the extrusion using the pushtrusion process as described above.

The wood particles or other cellulose-containing particles embedded in the thermoplastic synthetic matrix material increase the E-modulus of said material considerably (various times higher, approximately 4-5 times to 4-8 times higher than standard polyethylene or polypropylene). As a result of the high content of wood particles or other cellulose-containing particles, a high E-modulus of the composite material after cooling is obtainable, for example, of more than approximately 5,000 MPa (725,000 psi), in a preferred embodiment approximately 5,000-14,000 MPa (725,000-2,030,000 psi), in a further preferred embodiment even approximately 7,000-12,000 MPa (1,015,000-1,740,000 psi). Thus, it can be achieved that the reinforcement elements, when considered in transverse direction to it, are kept in place by bending the construction element. As a result the moment of inertia of the construction element is preserved. In a thermoplastic material that is not provided with such a fraction of wood particles or other cellulose-containing particles the reinforcement elements would be able to migrate in a transverse direction when bent and thus get closer to the neutral line. This could cause elastic instability (buckling).

The wood particles or other cellulose-containing particles have a moisture content of lower than approximately several % by weight, preferably lower than approximately 1% by weight when added in the thermoplastic synthetic material. Therefore, moisture will be absorbed by said particles after the manufacturing process is finished and still later under conditions of actual use, such as in open air. Due to this tendency of moisture absorption these wood particles will expand, which however is at least partially prevented by the external or internal additional continuous reinforcement elements present, as described herein as a result of which inherent compression stress in the matrix of the composite material is generated. This results in an increase of the bending strength of the construction element. Due to the high content of wood particles or other cellulose-containing particles in the thermoplastic matrix and the tight engagement of reinforcing elements with the profile, a pre-stressed situation will continue to exist.

The increased stiffness of the matrix of the composite material makes it possible to make profiles with multiple hollow sections, particularly profiles having relatively thin walls. The high stiffness leads to higher elastic stability of the partitions between the multiple cavities that are loaded in compression and shearing.

The manufacturing process of the invention may take place in a simple and space-efficient manner when the reinforcement elements, when supplied, are bendable in the longitudinal direction.

In one embodiment of the invention, use is made of external reinforcement elements having a non-round cross-section, such as flat or strip-shaped elements.

In an alternative or additional embodiment the internal additional continuous reinforcement elements having a substantially round cross-section are customarily used.

Depending on the intended use, the additional external elements may be made of metal, synthetic material, natural fibers or tapes made of such fibers, yarn or glass/carbon fibers. The term "synthetic material" is intended to include thermoplastic synthetic polymers.

In particular, there is mentioned aromatic polyamide fibers (aramid fibers) as well as a polybenzoxazole fiber (PBO-fiber), poly {2,6-diimidazo-[4,5b-4',5'e]pyridinylene-1,4(2,5-dihydroxy)phenylene} fiber (M5-fiber) and UHMWPE fiber (high strength polyethylene fiber).

For a desirable appearance the rigid additional external element is made of wood, and thus is better adapted to the location of use when the profile is visible.

For enhancing the strength and rigidity of the composite synthetic material it is preferred that wood particles or other cellulose-containing particles in fiber form are used. The fibers preferably comprise a fraction of longer fibers, wherein said longer fibers are substantially oriented in the extrusion direction. As a result the bending and tensile strength is increased and the wood-like appearance of the material is enhanced.

The thermoplastic synthetic material preferably is a polyolefin, such as polyethylene or polypropylene, or a PVC, or a polycarbonate. PET polymers can also be used. The above terms are intended to include homopolymers, as well as copolymers.

The E-modulus of the composite material (matrix) is further increased when the content of wood particles or other cellulose-containing particles is approximately 50-80% by weight, preferably 70-80% by weight.

The additional continuous external elements can be adhered to the exterior of the profile after extrusion by heat fusion, welding or the like. They can also be glued or mechanically attached by means of screws or other fastening means.

The invention furthermore provides an elongated construction element built up from a composite material of a thermoplastic synthetic material and a mass on the order of 50% by weight or more, preferably between 50-80% by weight, more preferably approximately 70-80% by weight of wood particles or other cellulose containing particles, as well as embedded continuous longitudinal reinforcement elements.

Preferably the E-modulus is more than approximately 5,000 Mpa (725,000 psi), in a more preferred embodiment even 5,000-14,000 MPa, (725,000-2,030,000 psi) and in a most preferred embodiment approximately 7,000-12,000 Mpa (1,015,000-1,740,000 psi).

The elongated, compound construction element may have the shape of an I-profile, H-profile or another profile comprising a body and legs or arms that are protruding therefrom.

Alternatively the compound construction element may have the shape of a tubular profile or hollow profile, preferably having multiple cavities or hollow sections.

BRIEF DESCRIPTION OF THE DRAWINGS

The invention will be further understood with reference to the accompanying drawings, wherein, FIG. 1A shows a schematic view of the effect of unrestrained (free) expansion of a compound without continuous reinforcement;

FIG. 1B is a schematic view of the same composite element with a continuous restraining element, applied either externally or internally;

FIG. 2 is a representation of the compressive and tensile stresses in the composite profiles of the invention;

FIG. 3 is a graph showing both the responses of both profile types;

FIGS. 4A-4B show cross-sections of a profile manufactured according to the invention; and FIG. 4C shows a perspective view of assembled profiles of FIG. 4A; and FIGS. 5A, B and C show cross-sections of a profile according to the invention with internal and external reinforcement elements.

DETAILED DESCRIPTION OF EMBODIMENTS

FIG. 1A shows a schematic view of a representative elongated profile (1). The profile is rectilinear in shape, preferably rectangular with two parallel long sides (2) and two parallel short sides (3). If unrestrained, the profile would typically have elongation by unrestrained expansion, $\Delta L$, generally caused by moisture uptake due to contact by water, rain or humidity.

When manufactured in accordance with the present invention, a profile shown as a front view in FIG. 1B having a continuous restraining element (4) attached thereto in a secure, permanent manner, exhibits at most a much reduced expansion indicated by the distance $\delta$.

In the plastic-based composite with the restraining element there is a force-equilibrium between the wood plastic composite 5 that is in compression and the restraining element 4 that is in tension. This is illustrated in FIG. 2.

The wood plastic composite will absorb moisture and tends to expands. In first instance there will be an elastic behavior of the wood plastic composite and the resulting stresses in both components can be directly calculated from the force equilibrium:

$$\text{Total force} = \epsilon_c \cdot E_e \cdot A_e + (\epsilon_c - \epsilon_p) \cdot E_p \cdot A_p = 0$$

in this formula are $\epsilon_c$=resulting expansion of the combined product
$\epsilon_p$=free (unrestrained) expansion of the plastic-based composite
$E_e$=E-modulus of restraining element
$A_e$=total cross-sectional area of restraining element
$E_p$=E-modulus of the plastic-based composite (in profile direction)
$A_p$=total cross-sectional area of the plastic-based composite From the formula the following results can be obtained $$\epsilon_c = \epsilon_p \cdot E_p \cdot A_p / (E_e \cdot A_e + E_p \cdot A_p)$$

$$O'_c = \epsilon_c \cdot E_e$$

$$O'_p = (\epsilon_c - \epsilon_p) \cdot E_p$$

From the formulas it becomes clear that the product of E-modulus and cross-sectional area of the non-expanding element, $E_e \cdot A_e$, determines the reducing capabilities of this element. When the cross-sectional area of such an element (or a manifold of such elements) is given, the effect that it can produce is determined by the E-modulus of this element. The higher the E-modulus of the nonexpanding element, the larger the effect to reduce the expansion. These considerations are based on mechanical interaction between the plastic-based composite and the non-expanding element.

However, a plastic-based composite will show stress relaxation in case of prolonged loading. This is time-dependent behavior that is also responsible for creep deformation. Because of the stress relaxation during prolonged loading the stresses will diminish. This will result in an extra effect of reducing total expansion, δ. This is illustrated FIG. 3.

FIG. 3 shows that initially the restraining of the expansion is the result of the elastic balance between the plastic-based composite. In time however, the stresses in the plastic-based composite will diminish by stress-relaxation, causing the restrained expansion to diminish as well. This mechanism will only work this way when the non-expanding continuous reinforcement element is made of a material that is linearly non-elastic, showing no stress-relaxation. Examples of such materials are fibers or strips made out of fibrous or non-fibrous materials such as steel, glass fiber, carbon fiber and fibers made of aromatic polyamides (aramid fibers). In particular, there is mentioned a polybenzoxazole fiber (PBO-fiber), poly{2,6-diimidazo-[4,5b-4',5'e] pyridinylene-1,4(2,5-dihydroxy)phenylene} fiber (M5-fiber) and UHMWPE fiber (high strength polyethylene fiber).

It is very important that the non-expanding elements should be placed in the plastic-based composite product in such a manner that no bending deformations will occur as a result of the internal stresses that are built up. This means that the non-expanding elements must be placed in a balanced manner in the profile. In practice this means that either the non-expanding elements are placed in the so-called neutral line for bending of the cross-section or that the non-expanding elements are placed in a symmetrical pattern on two sides of the neutral line of the cross-section.

In a typical application plastic-based composite profiles are manufactured as a building material, to be machined and processed as wood profiles. Examples are siding profiles, decking profiles and roof profiles, as well as construction lineals and load bearing construction profiles like lintels. The non-expanding element should not obstruct the machineability of the profile so that it can be cut like wood. In view of this non-expanding elements could be made of fibrous materials like glass fiber, carbon fiber or fibers made of aromatic polyamides (aramid fibers). In particular there is mentioned a polybenzoxazole fiber (PBO-fiber), poly{2,6-diimidazo-[4,5b-4',5'e]pyridinylene-1,4(2,5-dihydroxy) phenylene} fiber (M5-fiber) and UHMWPE fiber (high strength polyethylene fiber).

In order to connect these reinforcing fibers to the plastic-based composite profile a prepreg should be made by impregnating the fibers with the same thermoplastic material as is present in the plastic-based composite. In the resulting tape that can be made this way, the thermoplastic embedding of the fibers will protect the fibers from damage. Moreover the tape can be applied to the plastic-based composite profile by means of thermowelding. This may even be done continuously during the production of the plastic-based composite profile.

For a good performance of the thermowelding the fiber reinforced tape should be thin (typically 0.5 to 2.5 mm thickness). In order to apply sufficient fibers in one step the tapes should be wide, typically 8 to 15 mm. For a good protection of the fibers from damage and an effective thermowelding process the impregnation of the fibers by the thermoplastic should be high, typically 80% wetting should be attained.

According to the invention, profiles can be manufactured at the desired length having a cross-section such as for instance indicated in FIG. 4A.

Thus, FIG. 4A shows a flat, rectangular profile 10, suitable for example as siding, having a flat upper surface 11, an underside 14 with a web 12 at one end and a bracket 13 at the opposite end. The upper surface 11 and the underside 14 have reinforcement tapes 15, 16 and 17 bonded thereto. The reinforcement tapes 15, 16 and 17 are intended for providing a tensile reinforcement, so that the composite material will become loaded in compression during moisture uptake. They are typically flat, but may also be of any convenient cross-section or textured, or provided with protrusions. The reinforcements can consist of glass fiber tape or tapes made of aromatic polyamide fibers (aramid fibers), yarns or wires that have been twisted into each other or embedded in a plastic tape. The material used for the wire may be glass fiber, (stainless) steel wire or twined steel cable embedded in a synthetic polymer material, for instance as synthetic yarn, having a high E-modulus and a low rupture strain. Composite material is particularly suitable, for instance carbon fibers, glass fibers or fibers made of aromatic polyamides (aramid fibers) in a synthetic matrix. In particular there is mentioned a polybenzoxazole fiber (PBO-fiber), poly{2,6-diimidazo-[4,5b-',5'e] pyridinylene-1,4(2,5-dihydroxy)phenylene} fiber (M5-fiber) and UHMWPE fiber (high strength polyethylene fiber). Natural yarns or twined fibers such as hemp, sisal, etc., may also be used.

A good bonding between the profile and the reinforcement elements may in principle be achieved in a number of ways (or a combination thereof). For example, the surface of the reinforcement elements can have such a morphology that a mechanical anchoring of the profile to the reinforcement elements occurs. This may for instance be realized by means of having a roughness or ribbed structure in the surface of the reinforcement tape. A second option for achieving the adhesion is where the surface of the reinforcement elements causes a chemical connection with the profile. This can be done by beforehand applying a thin layer of modified polymer on the reinforcement elements. The polymer of the reinforcement element has to interact with the polymer in the profile and due to its modification interact with the surface of the reinforcement elements. Such polymers are well known in the art for sizing. They are for example, polypropylene comprising functional groups for chemically or physically binding to both the surface of the reinforcement elements as well as the profile. In most cases, it therefore has one or more types of functional groups built into the polymer.

FIGS. 5A, B and C show representative cross-sections of profiles having interior reinforcement elements 20 as well as additional reinforcement elements 21, 21' or 22" which may be external.

It will be understood that there is a wide choice in the selection of suitable continuous elements for attachment to the profile. This depends on the intended function of the profile to be made (for instance, the function of a lintel). Independent thereof, the appearance of the profile can be made to look like wood.

The profile can be painted, nailed and screwed.

The apparatus for making the profiles of this invention is shown in copending application Ser. No. 10/801,989, published as US 2004/0219357A1 which is incorporated herein by reference. The apparatus typically includes a pushtruder having a feed, which merges into an extrusion die. A fiber-orientating device is incorporated in the extrusion die. Downstream of the extrusion die, immediately contiguous to it, a shaping unit is placed, wherein cooling facilities have also been incorporated. The shaping unit comprises a pre-shaping die, in which the profile is substantially shaped, and a cooling/shaping die attached to the die, in which the shape is further established. Downstream of the shaping unit a post-cooling unit or tank is positioned, in which optionally a further cooling/calibrating die may be positioned, immersed in the coolant in the cooling unit or tank, at the upstream end thereof. Furthermore, a tension control unit is positioned, and downstream thereof there is a sawing unit. Downstream thereof a discharge table is positioned, from where cut to length elements can be discharged in sideward direction to a container for discharging transport and storage.

It is to be understood that the above description is included to illustrate the operation of the preferred embodiments and is not meant to limit the scope of the invention. From the above discussion, many variations will be apparent to one skilled in the art that would yet be encompassed by the spirit and scope of the claims appended.

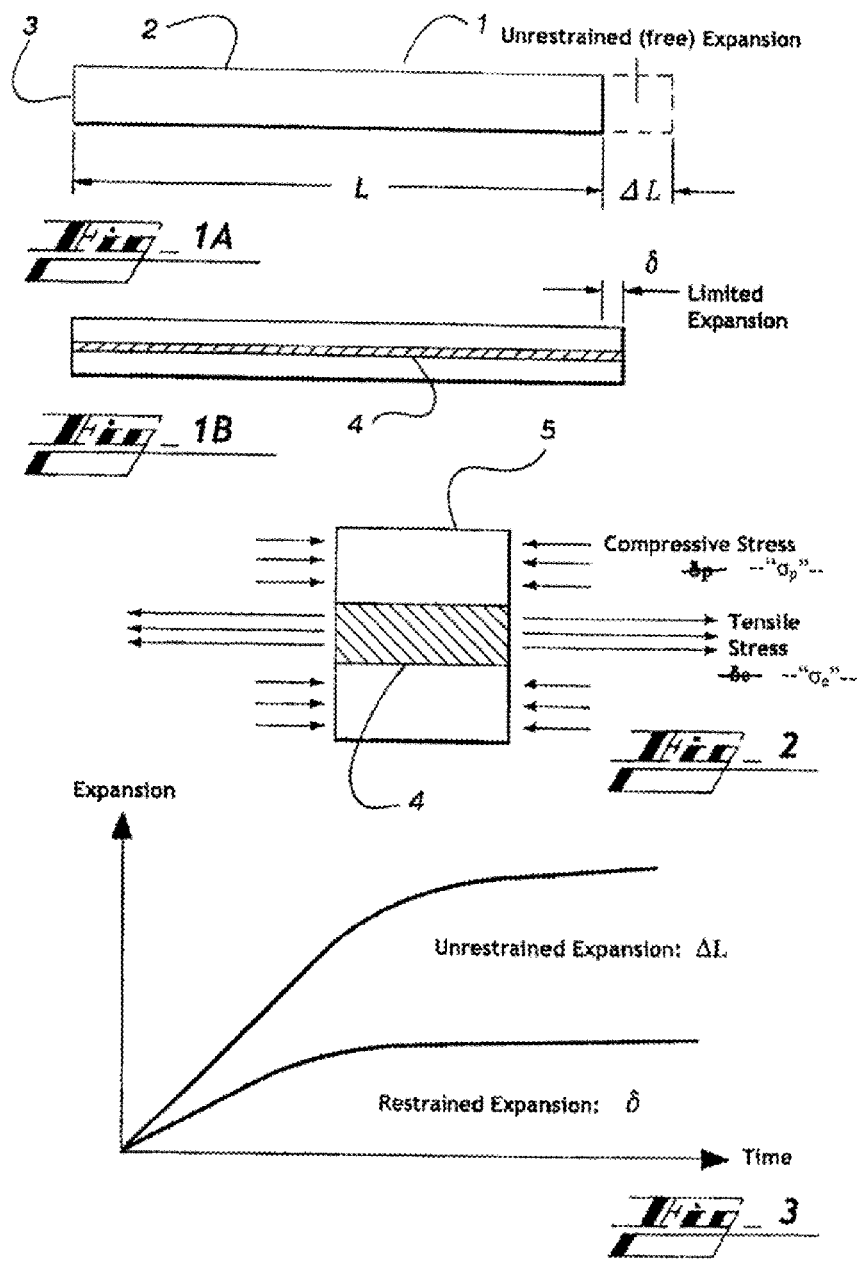

I claim:

1. An elongated, reinforced construction element in the shape of a tubular or hollow profile, an I-profile, H-profile or another profile comprising a body and legs or arms that are protruding therefrom having an E-modulus of 5,000 Mpa or more with a wood-like appearance comprising a composite material of a matrix of thermoplastic synthetic material selected from the group consisting of polyolefin, PVC and polycarbonate, and at least 50% by weight of a mass of dried cellulose particles containing approximately less than 1% by weight of moisture and composed of a portion of small fibers in the size of 0.2 to 2 mm and a fraction of large elongated particles of a size 2 to 6 mm, said composite material having attached to exterior or in the interior thereof at least one continuous longitudinal reinforcement element which is in tight engagement with said composite material for providing tensile reinforcement or compressive reinforcement whereby any expansion of said construction element due to moisture uptake will be suppressed.

2. The elongated construction element according to claim 1, wherein said mass is present in an amount of at least 50-80% by weight.

3. The elongated construction element according to claim 1, wherein said mass is present in an amount of at least 70-80% by weight.

4. The elongated construction element according to claim 1, wherein the element has an E-modulus of approximately 5,000-14,000 Mpa.

5. The elongated construction element according to claim 1, wherein the element has an E-modulus of approximately 7,000-12,000 Mpa.

6. The elongated construction element according to claim 1, made of nailable or screwable material.

7. The elongated construction element according to claim 1, designed as a tubular profile.

8. The elongated construction element according to claim 1, designed as a multiple tubular profile.

9. The elongated, reinforced construction element according to claim 1, wherein the reinforcement elements have a flat, strip-shaped, round, cable shape with twisted yarns or other cross section depending on where the continuous longitudinal reinforcement element is positioned in the construction element.

10. The elongated, reinforced construction element according to claim 1, wherein the reinforced elements are made of a glass fiber tape, carbon fiber tape or tape made of aromatic polyamide (aramid fiber).

11. The elongated, reinforced construction element according to claim 10 wherein tape is 8 to 15 mm in width and 0.5 to 2.5 mm in thickness.

* * * * *

UNITED STATES PATENT AND TRADEMARK OFFICE
CERTIFICATE OF CORRECTION

PATENT NO. : 7,445,830 B2
APPLICATION NO. : 11/841295
DATED : November 4, 2008
INVENTOR(S) : Dirk Van Dijk It is certified that error appears in the above-identified patent and that said Letters Patent is hereby corrected as shown below:

Delete drawings sheet 1 of 3 and substitute therefor the drawing sheet, consisting of fig. 1a - 3 as shown on the attached page.

Figure 2 please see the attached marked-up sheet with corrections.

"Detailed Description of Embodiments"
Column 4, Line 67 "expands" should read --"expand"--

Column 5, Line 20-22, the formula "
$$O^1_c = \varepsilon_c \cdot E_e$$
$$O^1_p = (\varepsilon_c - \varepsilon_p) \cdot E_p$$
" should read --"
$$\sigma_e = \varepsilon_c \cdot E_e$$
$$\sigma_p = (\varepsilon_c - \varepsilon_p) \cdot E_p$$
--

Signed and Sealed this

Tenth Day of March, 2009

JOHN DOLL
*Acting Director of the United States Patent and Trademark Office*